Aug. 6, 1940.  J. M. LARSON  2,210,868
STATIC PRESSURE REGULATOR
Filed Oct. 2, 1937   2 Sheets-Sheet 1
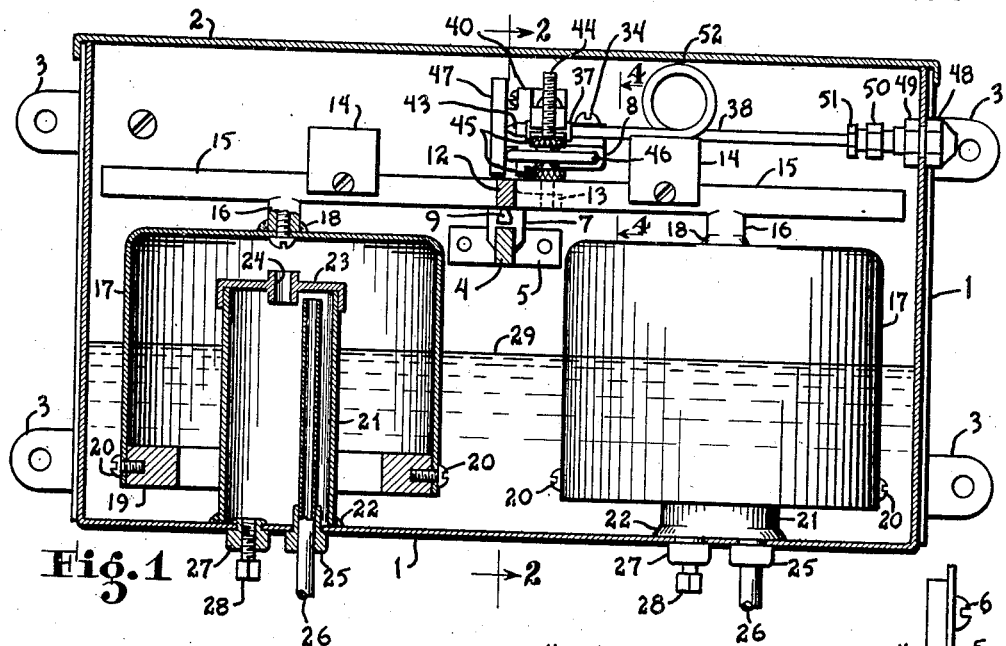
Fig. 1
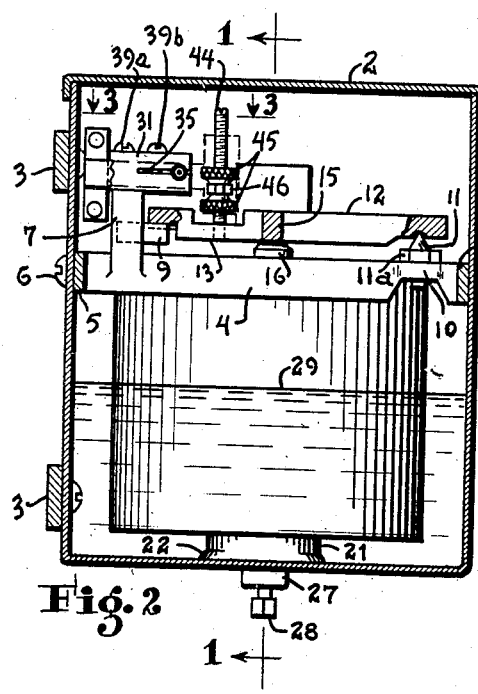
Fig. 2
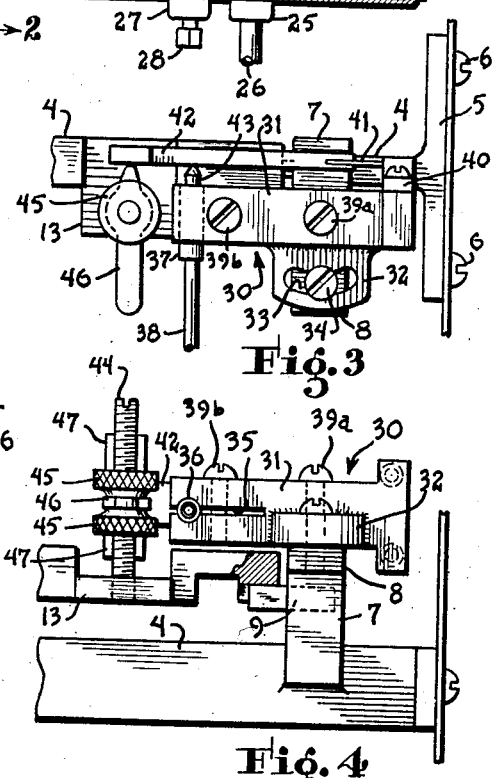
Fig. 3
Fig. 4
INVENTOR
John M. Larson
BY
George H. Fish
ATTORNEY Aug. 6, 1940.   J. M. LARSON   2,210,868
STATIC PRESSURE REGULATOR
Filed Oct. 2, 1937   2 Sheets-Sheet 2
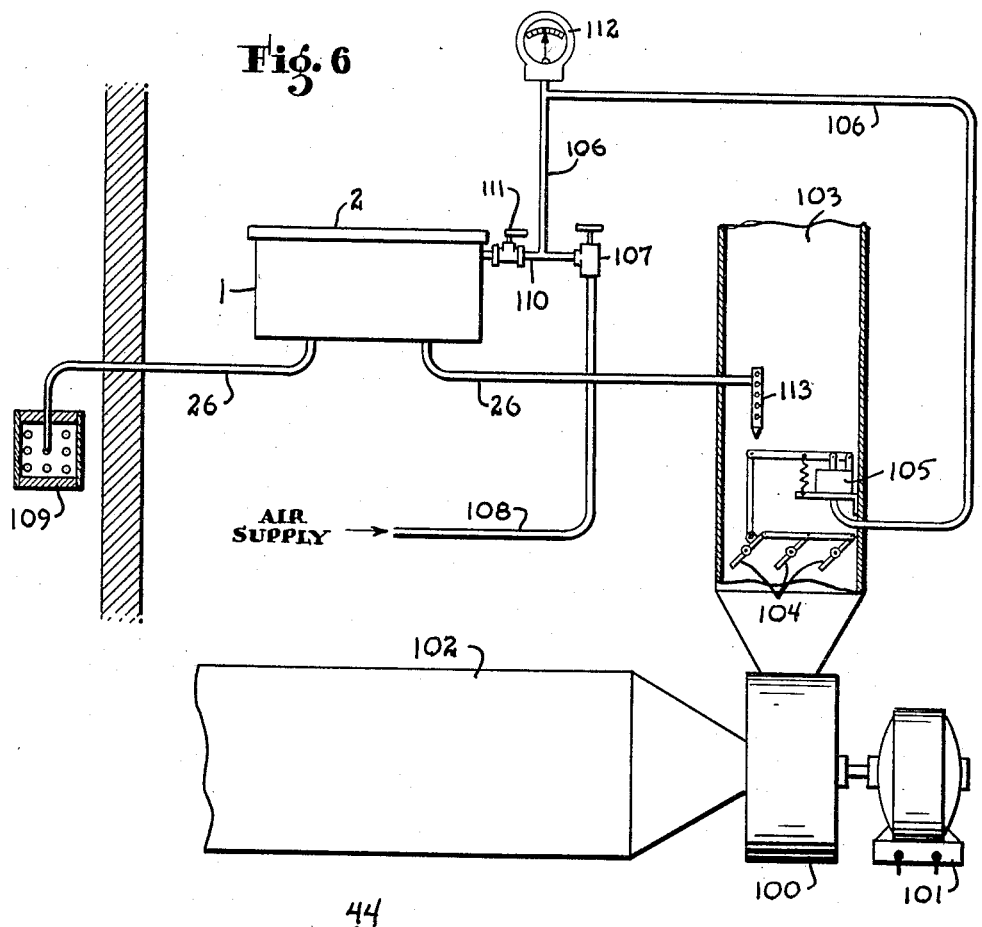
INVENTOR
John M. Larson
BY
George H. Fisk
ATTORNEY Patented Aug. 6, 1940

2,210,868

UNITED STATES PATENT OFFICE 2,210,868

STATIC PRESSURE REGULATOR

John M. Larson, Chicago, Ill., assignor to Minneapolis-Honeywell Regulator Company, Minneapolis, Minn., a corporation of Delaware Application October 2, 1937, Serial No. 167,073

7 Claims. (Cl. 137—153)

The present invention is concerned with pressure regulators and pertains more particularly to regulators for maintaining a constant differential between two regions wherein different pressures exist, such as between atmospheric pressure and the pressure in a conduit or the like, or for maintaining a constant pressure in one region.

In fluid circulating or distributing systems it is frequently necessary to maintain a constant pressure in certain portions of the circuit and in air circulating or ventilating systems or the like it is often desirable to maintain a constant differential between atmospheric pressure and the pressure at some point in the circulating system. To obtain this result, the fluid forcing means or the fluid flow must be governed in accordance with the pressure or the difference in pressures depending on whether it is desired to maintain a single pressure at a constant value or to maintain a constant differential between two pressures.

The present invention will be described as applied to an air distributing system wherein it is desired to maintain a constant differential between atmospheric pressure and the pressure in the conduit or duct conveying air to the point of distribution. In such a system a single fan may be employed to force ventilating or conditioned air to a plurality of rooms or spaces, the discharge duct from the fan branching off to distribute air to the various rooms or spaces. When the load on such a fan is varied by closing off branches to certain rooms or reducing the flow in certain branches, the pressure in the fan discharge duct will rise and will result in air being circulated too rapidly to the other rooms thereby causing drafts and unstable operation of controlling instruments and the like. Frequently the increased pressure when a number of branch ducts are closed will tend to cause the main air supply duct to bulge and possibly rupture.

The above are examples of faults and disadvantages to be overcome by application of the present invention to an air distributing system. However, it is understood that the invention has equal applicability and utility in various other types of apparatus and in other fluid circuits and systems.

Among the objects of the invention is to provide a device for maintaining a constant differential between two pressure regions, which device is sensitive to changes in the differential and responds accurately and quickly to such changes.

A further object is to provide a device for maintaining a constant pressure differential, having adjustments whereby any desired differential may be maintained regardless of fluctuations in either of the pressures to which the device is responsive.

Another object is to provide a device for controlling a valve, damper, or the like having novel means for adjusting the so-called throttling range or sensitivity of the instrument, that is, the increment change in valve position with respect to increment change in pressure conditions.

Another object is to provide a pressure regulating device by which a pressure can be maintained accurately at any constant value.

Another object is to provide novel structure in a differential pressure regulator for adjusting the setting from one pressure or pressure differential to another and accurately and quickly bringing the system back into equilibrium.

Another object of the invention is to provide a novel structural arrangement in a bell chamber to prevent the liquid in the bell chamber from overflowing into a pipe leading to the upper portion of the bell chamber.

Various other objects and advantages of the invention will become apparent to those skilled in the art from a reading of the following detailed description and the accompanying drawings.

Referring to the drawings:

Figure 1 is a side elevation partly in cross section of the automatic pressure regulator as seen along line 1—1 of Figure 2, Figure 2 is a cross sectional view taken along line 2—2 of Figure 1, Figure 3 is a plan view of a detail portion of the structure taken along line 3—3 of Figure 2, Figure 4 is a side elevation of the detail structure of Figure 3, taken along line 4—4 of Figure 1, Figure 5 is an enlarged view of that portion of the structure shown in detail in Figures 3 and 4 as seen in Figure 1, and Figure 6 is a diagrammatic showing of a portion of an air distributing system having the present invention applied thereto for regulating the pressure differential between the atmosphere and that in the conduit conveying air to the point of distribution.

Referring to the drawings and more particularly to Figures 1 to 5, reference numeral 1 indicates a metal tank of rectilinear formation having one relatively longer and one relatively shorter dimension with the depth equal approximately to the shorter dimension. Fastened to the tank by screws or the like are longitudinal bar members 3 which are perforated at their ends and provide for mounting the tank on a vertical wall or bulkhead. Numeral 2 indicates a flat top or cover having a down-turned peripheral flange for engagement over the top of the tank.

Within the tank and extending transversely between the side walls midway between the ends is a horizontal cross beam or member 4. The cross member 4 has integral transversely extending portions 5 at its ends which are perforated and provide for mounting of the member by screws 6 between the side walls of the tank. The cross member 4 has an integral vertically extending portion 7 from which extends horizontal lug-like supporting portion 8. Engaging with the vertical portion 7 in screw threaded relation is a member 9, that part of which extends from the vertical member 7 being formed as a knife edge as best shown in Figures 4 and 5. The member 9 may be formed from a cylindrical piece of stock which has a screw threaded portion for engaging with the vertical member 7.

Adjacent the end opposite portion 7 of cross member 4 which is of generally bar-like configuration is an enlarged portion 10 the sides of which have a rounded conformation and which has a depth materially less than the remaining part of cross member 4. This portion 10 of the cross member 4 is tapped to receive a screw 11, the upper end of which is formed as a conical point. A lock nut 11a engages the screw 11 and retains it in fixed relation to the portion 10 of cross member 4.

Mounted on the knife edge 9 and the conical point of the screw 11 in balancing relation thereto is a cross member 12. Cross member 12 takes the form of a generally rectilinear bar having a depression or recess adjacent one end adapted to engage the conical point of screw 11 and having a portion at the opposite end notched for engagement with the knife edge 9. Cross member 12 also has a depressed portion as at 13, a portion of which extends horizontally from member 12 as shown in Figure 3 for a purpose which will be hereinafter described.

Integrally formed with the cross member 12 is a rectilinear bar-like member 15 which extends transversely of the member 12 and longitudinally within the tank 1. Approximately midway between the center of the bar member 15 and each of its ends are integrally formed cylindrical portions 16. Each of the portions 16 is rigidly secured to the closed end of a bell chamber 17 by welding or soldering as shown at 18 and also by a screw which extends through the closed end of each bell chamber and screws into the cylindrical portion 16 of the bar member 15. The welding or soldering at 18 renders the juncture of portions 16 with the bell chambers airtight. Each of the bell chambers 17 comprises a generally cylindrical inverted vessel preferably made of the same material as the tank 1 and having a metal ring 19 secured within the open end of the vessel adjacent the rim. The ring 19 is secured in position by screws 20 engaging with the side walls of the bell chamber 17 and screwed into holes tapped into the ring.

In sliding engagement with member 15 are metal counter-weights 14, having slots for slidably receiving the bar member and set screws for immovably setting the weights in any desired position with respect to the bar.

Upstanding from the bottom of the tank 1 are two wells 21 each comprising generally a metallic cylinder welded or soldered to the bottom of the tank as shown at 22. Each of these wells is positioned approximately at the center of the opening within the ring 19 of the respective bell chamber 17. Each of the wells 21 has a cap or cover member 23 having a flanged opening in the central portion as shown at 24, and a flanged rim for engaging the well.

In the bottom of the tank 1 within the wells 21 are plugs or adaptor members 25 for tightly receiving conduits or pipes 26 which form standpipes within wells 21 which are in communication through the openings 24 with the interior of the bell chambers 17. Also at the bottom of the tank 1 within the wells 21 are plug members 27 having screw threaded openings engaged by screws 28 which provide for draining the wells.

Tank 1 is filled with a liquid such as a light grade of mineral oil or the like to the level as indicated at 29.

Referring again to the vertical portion 7 of the cross member 4 it will be seen that horizontally extending portion 8 (see Figure 4) provides a support for an assembly generally indicated by the numeral 30. The assembly indicated by the numeral 30 is best shown in Figures 3 and 4 and includes a metal member 31 having a lug portion 32 with an arcuate slot 33 for adjustable engagement with screw 34 which is threaded into the horizontally extending portion 8 integrally formed with vertical portion 7 of cross member 4.

The member 31 forming a part of the assembly 30 has a horizontal slot, as shown at 35, and adjacent the outer end of this slot are formed recesses or depressions 36 which together conform generally to the contour of a conduit or fitting 37. The fitting 37 is welded or soldered to the end of a tube 38 which will be referred to later in the description. The member 31 is drilled to receive screws 39a and 39b. Screw 39a extends through a drilled hole in member 31 which is not threaded and thereafter engages in threaded relation with the horizontal lug-like portion 8 previously described. Member 31 and thus the assembly 30 is rotatable about screw 39a as a pivot when screw 34 is loosened. Screw 39b is threaded into member 31 and tends when tightened to draw the portions of member 31 adjacent the slot toward each other thereby securely retaining the fitting 37 in the recesses or depressions 36.

The assembly indicated by the numeral 30 also includes a metal block member 40 which forms a shoe or retaining element for a strip of resilient spring metal indicated at 41. The shoe 40 is secured by screws to member 31 as shown (see Figure 3). The resilient spring element 41 is inserted in a rabbeted slot, or the like, in member 40 and provides a support for lever arm element 42 which forms a part of a valve device in that the lever arm pivots about the seat of spring element 41 in metal shoe member 40. The members 41 and 42 are so mounted with respect to the metal block or shoe member 40 and the member 31 that their plane surfaces lie substantially in a vertical plane as shown in Figure 3. It will also be seen that the mounting position of the arm or lever 42 brings it adjacent to a nipple or the like 43 forming a part of the fitting 37 and extending beyond the metal member 31.

Referring now to the depressed and horizontally extending portion 13 of the cross bar 12, it will be seen that this portion is tapped as shown to receive a vertical screw member 44. Carried on the screw member 44 are two thumb nuts 45 between which is a small dog or arm 46 which is in rotatable engagement with the screw 44 when either of the thumb nuts 45 is loosened with respect to the dog 46. One end of the dog 46 contacts the vertical flat surface of the previously described lever member 42. The end of the member 42 which is adjacent screw 44 has a portion of relatively greater vertical extent as shown at 47 and provides a vertical surface of considerable extent for contacting with the extending portion of the dog 46.

Near the upper part of one side wall of tank 1 is a plug member or fitting 48 which extends through an opening in the side wall of the tank and is threaded to receive a nut 49 inside the tank. The portion of the plug which is outside the tank is formed to receive a wrench or the like and is also adapted to receive a fitting or coupling for connection to a pipe or conduit. Tightening of the nut 49 secures fitting 48 and the nut tightly against the side walls of the tank. Fitting 48 is also internally threaded to receive coupling member 50 into which is screwed a fitting 51 at the end of the looped tube 38. The looped tube 38 is made of resilient or flexible metal and is provided with loop 52 so that the fitting 37 at the end can be adjusted back and forth without disturbing the connections in the side wall of the tank, the loop providing the necessary elasticity.

Figure 6 indicates more or less diagrammatically a fan having a damper in the discharge conduit thereof, and the regulator device of this invention applied thereto for the purpose of maintaining a constant differential between the static pressure in the discharge conduit and the atmosphere. Reference numeral 100 indicates a fan driven by a motor 101 and having a suction conduit 102 and a discharge conduit 103. Within the discharge conduit 103 is a damper 104 comprising a lever connected to a plurality of louvre members. The damper 104 is operated by a bellows motor 105 inside of the discharge conduit. Bellows motor 105 is connected by a conduit 106 through a restriction 107 to a suitable source of constant air pressure from conduit 108.

The pressure regulator of this invention is suitably supported on a wall or bulkhead of the room or enclosure in which the fan 100 is located. The space within the interior of one of the previously described bell chambers communicates through a conduit 26 with the exterior of the building, which conduit terminates in a box or the like 109. The box 109 has perforated side walls whereby atmosphere pressure can be communicated to the interior of the bell chamber and which prevent the velocity of air movements on the exterior of the building from having any effect on the air pressure within the bell chamber. Only the static pressure of the atmosphere is therefore communicated to the interior of the bell chamber.

The space within the interior of the other bell chamber of the regulating device communicates through a conduit 26 with a static pressure measuring element 113 located within the discharge conduit of the fan. The element 113 comprises a jacket or casing arranged with its longitudinal axis parallel to the air stream and having orifices in its side walls arranged at right angles to the direction of flow of the air stream. Thus the element 113 serves to communicate only static pressure through conduit 26 to the interior of the bell chamber and does not sense any pressure in the discharge conduit due to the velocity of the air moving therethrough.

The looped tube 38 within the tank 1 which has been previously described communicates with the outlet of restrictor 107 through a connection 110 having a valve 111 for cutting off the pressure regulator from the air supply. The nipple 43 in the fitting 37 at the end of looped tube 38 has a port of small diameter through which the air pressure from the supply conduit 108 is permitted to bleed. Pressure in conduit 106 and indicated by the pressure gage 112 is determined by the rate at which air is permitted to be bled from the port of the nipple 43. Thus the rate of bleeding determines the pressure in bellows motor 105 and consequently the position of the damper 104.

From the preceding structural description it is thought that it will be apparent to those skilled in the art as to the general manner in which the invention of this application operates. However, for purposes of making more clearly apparent the utility and novelty of the device, its operation will be described in detail in connection with the fan diagrammatically shown in Figure 6.

It will be understood that the fan 100 may serve to force air through discharge conduit 103 to a number of separate rooms or enclosures. In order to insure that each of the various enclosures receives its proper volume of air at times when other rooms or spaces may be cut off and put out of use, it is necessary that the pressure in the discharge conduit remain constant. As the pressure and density of the atmosphere exterior to the building may vary it is necessary that the pressure in conduit 103 be maintained constant with respect to atmospheric pressure. If the pressure in conduit 103 were held constant irrespective of changes in atmospheric pressure, the volumes of air forced to individual rooms or spaces would be erratic due to the variations in density of the outside atmosphere. Consequently this invention provides a differential regulator for maintaining the difference between the pressure in conduit 103 and atmospheric pressure constant.

In operation, when the system is in equilibrium the pressure in conduit 103 will be at its proper value with respect to atmospheric pressure. Under these circumstances the pressures within the bell chamber 17, and the counterweights associated with the bar 15 which is integrally connected to the bar member 12 will operate to balance each other and prevent any angular movement of members 12 and 15 about the pivot points 11 and 9. If either the atmospheric pressure or pressure within conduit 103 fluctuate in either direction the pressure in the corresponding bell chamber is varied accordingly. For example, a rise in pressure in conduit 103 without a corresponding rise in atmospheric pressure would cause the bell chamber 17 at the right, as seen in Figure 1, to move upwardly slightly; this would move the arm 15, cross member 12, and members 44 and 45 in a counter-clockwise direction thereby causing dog 46 to move portion 47 of lever 42 away from the bleed port in nipple 43. The rate of bleeding being increased, the pressure in conduit 106 would tend to fall, thus causing damper motor 105 to move damper 104 towards closed position. This closing movement of the damper would tend to reduce the pressure in conduit 103 and cause the system to regain its state of equilibrium. A rise in atmospheric pressure without a corresponding rise in conduit 103 would cause a similar sequence of operation of the devise, the bell chamber on the left, as seen in Figure 1, rising and moving portion 47 of lever 42 toward the bleed port in nipple 43, thereby increasing the pressure in conduit 106 and tending to open the damper 104. Thus this operation would tend to restore the original pressure differential.

In making adjustments in the control point of the instrument to maintain a different constant pressure or pressure differential, the counterweights 14 may be readjusted on arm 15 to balance the changed pressure conditions in the bell chambers. The assembly indicated by numeral 30 and carrying nipple 43 of looped tube 38 may then be bodily adjusted by loosening screw 34 and angularly repositioning assembly 30 about screw 39a as a pivot, screw 34 assuming a new position with respect to slot 33. Such adjustment provides a new bleed rate for the same angular position of members 15, 12, and 44 which is just sufficient for the damper opening necessary to produce the desired balancing pressure in conduit 103.

For providing a sensitivity adjustment the thumb nuts 45 are arranged on either side of the dog or lever 46 on screw 44. As is apparent, the screw 44 oscillates with cross bar 12 in arm 15. By adjusting the thumb nuts 45 and dog 46 vertically, that is, away from the center of oscillation of screw 44 it will readily be seen that the linear distance moved by dog 46 for the same angular movement of arms 15 and cross member 12 is increased. The thumb nuts 45 and dog 46 provide a convenient and simple device for making fine adjustments in the sensitivity of the instrument.

From the above description of the structure in operation it will be apparent that the invention provides a novel and useful device for maintaining a constant pressure differential between two regions of different pressures as has been explained. It is also, however, within the contemplation of the invention that the device be utilized to maintain constant a single pressure. This purpose may be accomplished by sealing the interior of one of the bell chambers from communication with the outside atmosphere. The pressure within the tank acting on the exterior of the two bell chambers would be equal on each and would balance. Therefore, changes in atmosphere pressure would have no effect upon the instrument. Due to the movement of the bells being very slight, the pressure beneath the sealed bell chamber would be substantially constant and the device would then operate to maintain the pressure being communicated to the interior of the other bell chamber constant. In other words, the device would be acting to govern a single pressure and would be influenced by that pressure only.

While I prefer to utilize two bells for actuating the control valve, it will be understood that my invention is not limited to such an arrangement, for in certain cases, it may be feasible to utilize only a single bell.

The structure including the wells within the bell chambers 17 and the ends of the conduits 26 which form standpipes within the wells, is particularly useful in apparatus of this type. With the type of pressure regulator with which this invention is concerned, inconvenience has frequently been experienced by liquid overflowing into the upstanding portions of conduit 26 or other similar means providing communication with the region where the pressures to be governed exist. By providing the wells 21 having cover portions provided with an opening, the liquid level must obviously rise as high as the opening in the cover portion before it can overflow into the well, and then enough overflow must take place to fill the well to the top of the standpipe formed by conduits 26 before overflow can take place into the conduits 26. Thus overflow of oil into conduits 26 is prevented. The screw plugs 27—28 provide for draining any liquid which may overflow into the wells 21.

Having described the structure and operation of the invention and having pointed out its principal novelty, utility, and advantages, it is thought that those skilled in the art will appreciate its merit and recognize its contribution to the art involving pressure regulators. There are many modifications and variations which applicant has not made reference to which will occur to those skilled in the art and it is intended that the above description and drawings shall be interpreted as an illustrative embodiment only of the invention and that the scope of the invention is to be limited only by the appended claims.

I claim as my invention.

1. In a pressure regulator a pair of bell floats contacting with a liquid, means providing communication between the interior of each bell float and a separate pressure region, a lever attached to the upper portion of both bell floats, fulcrum means for said lever between said bell floats, said fulcrum means having a knife-edge and a point in spaced relation for supporting said lever whereby said lever oscillates in a single plane, adjustable weights slidably engaging said lever on each side of said fulcrum for counterbalancing the pressures in said bell floats, means actuated by said lever, said lever including means for adjusting the operative relation between said lever and said actuated means, said actuated means having adjustable mounting means.

2. In a device for regulating pressures, in combination, a tank containing a liquid. a float in said tank and contacting the liquid, means for causing said float to rise and lower upon variations in pressure at a predetermined point, a lever in said tank, said lever having a fulcrum and being rotated about its fulcrum in one direction upon rising of said float and being rotated in the opposite direction upon lowering of said float, an arm attached to said lever adjacent said fulcrum, said arm being substantially normal to both said lever and said fulcrum and oscillating with said lever, control valve means in said tank, said control valve means including a valve lever having a portion extending parallel to said arm, and a movable member between said valve lever and said arm, said movable member transmitting motion of said arm to said valve lever, movement of said member along said arm and valve lever varying the ratio of movement of said arm to movement of said valve lever.

3. In a deice for regulating pressures, in combination, a tank containing a liquid, a lever structure having centrally located fulcrum means, said lever structure carrying a pair of bell floats, one of said bell floats being attached to said lever structure on one side of said fulcrum means and the other of said bell floats being attached to said lever structure on the other side of said fulcrum means, said bell floats having open sides extending beneath the surface of said liquid, means for communicating a controlling pressure with the interior of at least one of said bell floats to thereby cause rising and lowering of said one bell float upon rising and lowering of said controlling pressure with consequent oscillation of said lever structure, an arm attached to said lever structure at a point adjacent the axis of the fulcrum means, said arm being substantially normal to both said lever structure and said axis and oscillating with said lever structure, control valve means including a valve lever having a portion extending parallel to said arm, and a movable member between said valve lever and said arm, said movable member transmitting motion of said arm to said valve lever, movement of said member along said arm and valve lever varying the ratio of movement of said arm to movement of said valve lever.

4. In a device for regulating pressures, in combination, a tank containing a liquid, a lever structure in said tank, said lever structure comprising a first arm, said first arm being supported at one end by a knife edge and at its other end by a point, said knife edge and point being in alignment for providing substantially frictionless rocking of said lever structure, said lever structure also comprising a second arm attached to said first arm and extending transversely of said first arm, a pair of bell floats attached to said second arm, one of said bell floats being attached to said second arm on one side of said first arm and the other of said bell floats being attached to said second arm on the other side of said first arm, means for communicating a controlling pressure with the interior of one of said bell floats, a third arm attached to said lever structure and being substantially normal to said first and second arms, control means including a control lever having a portion extending parallel to said third arm, and a movable member between said control lever and said arm, said movable member transmitting motion of said arm to said control lever, movement of said member along said third arm and said control lever varying the ratio of movement of said third arm to movement of said control lever.

5. In a device for regulating pressures, in combination, a tank containing a liquid, a lever structure in said tank, said lever structure comprising a first arm, said first arm being supported at one end by a knife edge and at its other end by a point, said knife edge and point being in alignment for providing substantially frictionless rocking of said lever structure, said lever structure also comprising a second arm attached to said first arm and extending transversely of said first arm, a pair of bell floats attached to said second arm, one of said bell floats being attached to said second arm on one side of said first arm and the other of said bell floats being attached to said second arm on the other side of said first arm, means for communicating a controlling pressure with the interior of one of said floats, and a control device actuated upon movement of said lever structure caused by change in value of said controlling pressure.

6. In a device for regulating pressures, in combination, a tank containing a liquid, a lever structure in said tank, said lever structure comprising a first arm, said first arm being supported at spaced points by substantially frictionless supporting devices, at least one of said supporting devices comprising a point engaging a depression in said first arm for preventing both longitudinal and lateral movement of said first arm while permitting free rocking movement thereof, said lever structure also comprising a second arm attached to said first arm and extending transversely of said first arm, a pair of bell floats attached to said second arm, one of said bell floats being attached to said second arm on one side of said first arm and the other of said bell floats being attached to said second arm on the other side of said first arm, means for communicating a controlling pressure with the interior of one of said bell floats, and a control device actuated upon rocking movement of said lever structure caused by change in value of said controlling pressure.

7. In a device for regulating pressures, in combination, a tank containing a liquid, a lever structure in said tank, said lever structure comprising a first arm, said first arm being supported at spaced points by substantially frictionless supporting devices, at least one of said supporting devices comprising a point engaging a depression in said first arm for preventing both longitudinal and lateral movement of said first arm while permitting free rocking movement thereof, said lever structure also comprising a second arm attached to said first arm and extending transversely of said first arm, a pair of bell floats attached to said second arm, one of said bell floats being attached to said second arm on one side of said first arm and the other of said bell floats being attached to said second arm on the other side of said first arm, means for communicating a controlling pressure with the interior of one of said bell floats, a control device actuated upon rocking movement of said lever structure caused by change in value of said controlling pressure, and means for varying the degree of movement of said control device for a given change in value of said controlling pressure.

JOHN M. LARSON.